J. FORSYTH.
Device for Use in Reciprocating Churns.
No. 200,271. Patented Feb. 12, 1878.
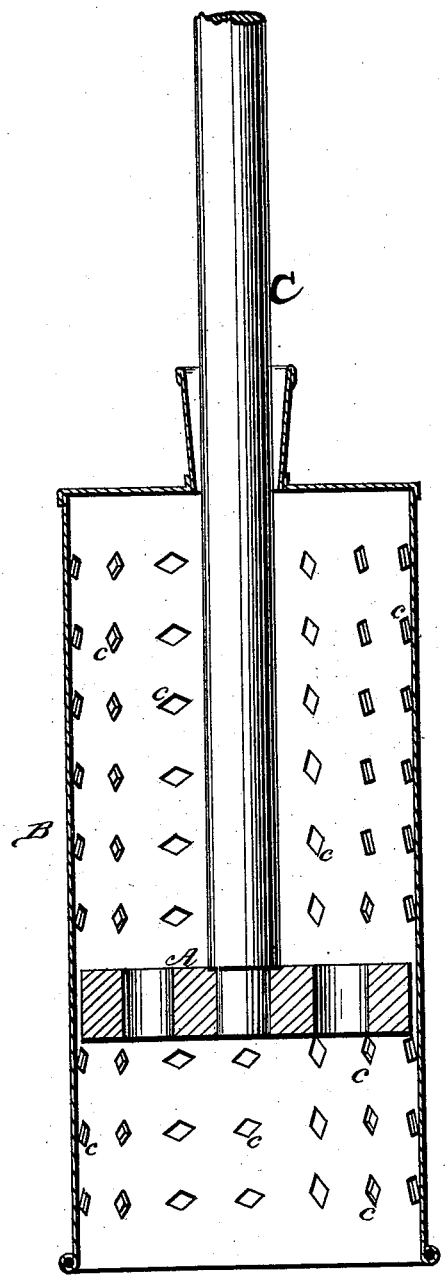

UNITED STATES PATENT OFFICE.

JOHN FORSYTH, OF PARIS, TEXAS.

IMPROVEMENT IN DEVICES FOR USE IN RECIPROCATING CHURNS.

Specification forming part of Letters Patent No. 200,271, dated February 12, 1878; application filed January 12, 1878.

*To all whom it may concern:*

Be it known that I, JOHN FORSYTH, of Paris, in the county of Lamar and State of Texas, have invented a new and valuable Improvement in Churn Devices; and I do hereby declare that the following is a full, clear, and exact description of the construction and operation of the same, reference being had to the annexed drawing, making a part of this specification, and to the letters of reference marked thereon.

The figure is a representation of a longitudinal vertical section of my churn device.

My invention relates to that class of churns which are constructed with a vertical dasher proper inclosed and operating within a perforated cylinder; and my improvement consists in providing the cylinder with angular perforations, in contradistinction to round perforations and long slots, as hereinafter particularly described and claimed.

It is well known to proficients in the art that butter rests in milk and cream within small sacks or capsules, and that the first process in the art of churning consists in breaking such sacks and releasing the butter therefrom. The next and final step in the process consists in gathering the butter so released into a compact mass. For a speedy accomplishment of both these steps in the process of churning my device is found especially adapted.

A of the drawing represents a churn-dasher proper, provided with a suitable handle, C; and B, a perforated cylinder. These are arranged, when on duty, within any suitable vessel, but preferably within one the diameter of which shall be but a few inches greater than that of the cylinder, inasmuch as the process of churning is carried on with greatest facility when the milk or cream occupies but little space outside the cylinder.

The letters *c c* represent angular perforations through the cylinder. These may be triangular or polygonal in shape, but preferably in the form of a diamond. The object of these angular openings is to insure the passage of the milk or cream in and out of the cylinder through openings that have well-defined corners and angles, against which the milk or cream shall strike and the butter-sacks be broken by contact and friction. These openings, especially of the diamond form, aid, furthermore, in gathering the released butter by furnishing ingress and egress to the mass through long and acute angles, against the walls of which the fluid constantly strikes, and is forced and partially strained through the angular spaces.

It is evident that the action of the dasher inside the cylinder will force the milk or cream both in and out of the cylinder by the usual up-and-down movements.

It is desirable that the churn should be of such size as will permit the top of the cylinder to rest against the bottom of the cover, or that said cylinder be otherwise securely fastened.

What I claim as new, and desire to secure by Letters Patent, is—

The improved churn device, consisting of a cylinder, B, having a series of angular openings, *c*, and a dasher, A, arranged and adapted for use as described.

In testimony that I claim the above I have hereunto subscribed my name in the presence of two witnesses.

JOHN FORSYTH.

Witnesses:
 MANNING L. NIX,
 JAMES M. STONE.